(12) United States Patent
Shin et al.

(10) Patent No.: US 7,674,572 B2
(45) Date of Patent: Mar. 9, 2010

(54) EXPOSURE MASK PATTERN FOR LCD AND EXPOSURE METHOD USING THE SAME

(75) Inventors: Kwang Hoon Shin, Seoul (KR); Hyun Suk Jin, Goonpo-si (KR); Ho Jin Ryu, Euiwang-si (KR); Won Seok Kang, Gyeongsangbuk-do (KR); Deuk Su Lee, Yongin-si (KR)

(73) Assignee: LG. Display Co., Ltd., Seoul (KR)

( * ) Notice: Subject to any disclaimer, the term of this patent is extended or adjusted under 35 U.S.C. 154(b) by 625 days.

(21) Appl. No.: 11/170,849

(22) Filed: Jun. 29, 2005

(65) Prior Publication Data
US 2006/0057788 A1  Mar. 16, 2006

(30) Foreign Application Priority Data
Sep. 13, 2004  (KR) .................... 10-2004-0072883

(51) Int. Cl.
*G03F 7/20* (2006.01)
*G02F 1/13* (2006.01)

(52) U.S. Cl. .................. 430/319; 430/321; 430/394
(58) Field of Classification Search .................. None
See application file for complete search history.

(56) References Cited

U.S. PATENT DOCUMENTS

| 5,026,143 | A | * | 6/1991 | Tanaka et al. ............... 349/143 |
| 5,656,526 | A | * | 8/1997 | Inada et al. ................. 430/314 |
| 5,795,686 | A | * | 8/1998 | Takizawa et al. | |
| 5,943,034 | A | * | 8/1999 | Adachi ..................... 345/94 |
| 6,146,796 | A | * | 11/2000 | Kim ......................... 430/30 |
| 6,606,141 | B2 | * | 8/2003 | Takasugi et al. ............ 349/139 |
| 2004/0069757 | A1 | * | 4/2004 | Nakata et al. ........... 219/121.69 |
| 2004/0252266 | A1 | * | 12/2004 | Shimizu et al. ............ 349/139 |

* cited by examiner

*Primary Examiner*—John A. McPherson
(74) *Attorney, Agent, or Firm*—Brinks Hofer Gilson & Lione (57) ABSTRACT

An exposure method for an LCD is provided. In the method, a sub-pixel region of an array substrate is divided into a first exposure region and a second exposure region, and the first exposure region and the second exposure region are sequentially exposed.

12 Claims, 7 Drawing Sheets

EXPOSE LEGO PATTERN IN OVERLAPPED EXPOSURE REGION

EXPOSURE MASK PATTERN FOR LCD AND EXPOSURE METHOD USING THE SAME

This application claims the benefit of priority to Korean Patent Application 72883/2004, which was filed on Sep. 13, 2004, and which is incorporated herein by reference.

TECHNICAL FIELD

The present application relates to an exposure method for a liquid crystal display device (LCD). More particularly, the present application relates to an exposure mask pattern for an LCD and an exposure method using the same which can prevent a stitch failure and the degradation of image quality by exposing an LEGO pattern on a sub-pixel or pixel basis.

BACKGROUND

Due to dramatic advances in semiconductor industry technology, it is possible to manufacture liquid crystal display devices (LCDs) that are high-performance as well as compact and lightweight. Cathode ray tubes (CRTs) have been widely used as information display devices. However, CRTs have a number of drawbacks in terms of miniaturization and portability, despite their advantages of low cost and high performance.

LCDs have entered the spotlight as an alternative display device that overcomes the disadvantages of the CRT. Among the advantages of the LCD are its small size, low weight, and low power consumption. Today, the LCD is provided with almost all information processing equipment that requires a display device.

The LCD displays images using modulation of light generated by a liquid crystal cell. That is, a predetermined molecular arrangement of liquid crystals is converted to another molecular arrangement by applying a voltage to the liquid crystal cell. Light is emitted from the liquid crystal cell by the converted molecule arrangement. The LCD displays images by converting optical characteristics of the liquid crystal cell such as double refractivity, optimal rotary power, dichroism and light scattering characteristics into visual variations.

An LCD is manufactured by forming a gate line, a data line and a TFT on an array plate, forming R, G, B color filter layers on a color filter plate, aligning the color filter plate on a glass plate to be placed in opposition to the array plate, cohering the array plate and the glass plate, and injecting liquid crystals between the plates.

The array plate and the color filter plate in particular are formed by sequentially performing a plurality of mask processes.

In a mask process, an insulating layer or a metal layer is deposited on the entire surface of the glass plate using a chemical vapor deposition (CVD) or a sputter deposition method.

After deposition of the layer onto the plate, the surface of the deposited layer is cleaned and a photoresist layer is coated onto the surface. After coating, the photoresist layer is patterned by an exposure and development process using a mask.

The deposited layer is selectively etched using the patterned photoresist layer as a mask, and then the patterned photoresist layer is eliminated. By eliminating the patterned photoresist layer, a single mask step is completed.

Figure 1:
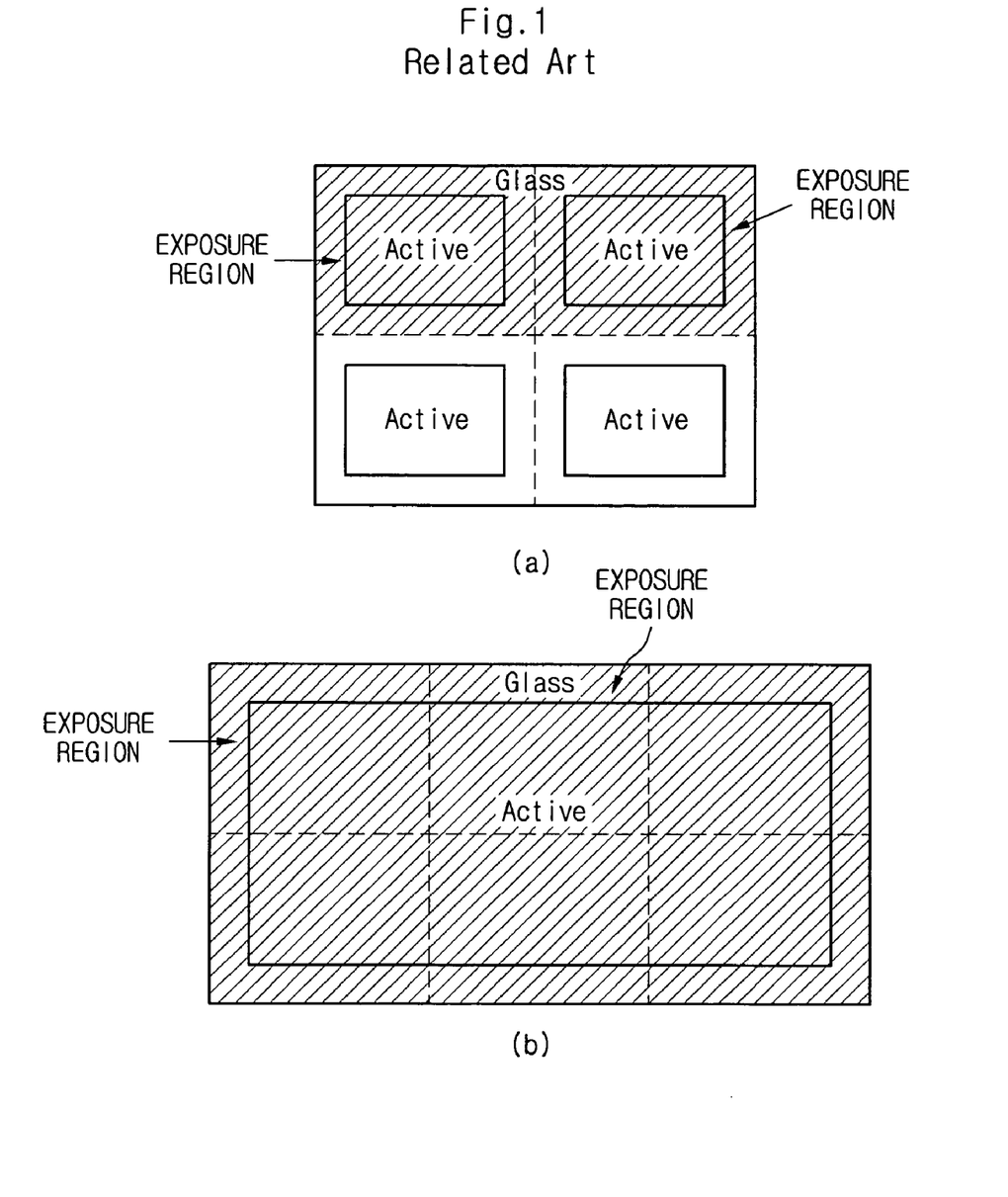
FIGS. 1(a) and 1(b) illustrates an exposure method used in a manufacturing method of an LCD according to a related art.

FIG. 1 illustrates an exposure method used in a manufacturing method of an LCD according to a related art.

As shown in FIG. 1, four active array plates are formed on single glass plate in (a).

That is, four active regions corresponding to four liquid crystal panels are formed simultaneously on the glass plate. After forming the four active regions, a cell process is carried out for dividing the glass plate into single active region units.

The process of forming the four active regions on the glass plate includes, for each of the four active regions, a first mask step of forming a gate line and a gate electrode, a second mask step of forming a channel layer, a third mask step of forming source/drain electrodes, a fourth mask step of forming a contact hole in a passivation layer, and a fifth mask step of forming a pixel electrode.

An exposure process is performed for the four active regions in each of the mask steps.

When the first mask step is carried out, a metal layer is deposited on the glass plate and a photoresist layer is coated on the metal layer. After coating, an exposure process is carried out using a mask pattern. The exposure process is performed four times on each active region sequentially.

In the exposure process, a single active region can be completely exposed by a one-time exposure process.

As shown in (b) of FIG. 1, one active region is formed on a glass plate in the case of a large LCD. In this case, a mask process cannot be completed with a single exposure process.

Since manufacturing costs increase in proportion to the size of the requisite exposure lens, a partitioned exposure process may be performed to reduce the manufacturing costs.

As described above, the partitioned exposure process completes a single mask process by performing a plurality of partitioned exposures on single active region. In contrast, the concentrated exposure process completes a single mask process by exposing an entire active region with a one-time exposure. One or the other of the partitioned exposure process and the concentrated exposure process is selectively used in manufacturing LCDs.

Figure 2:
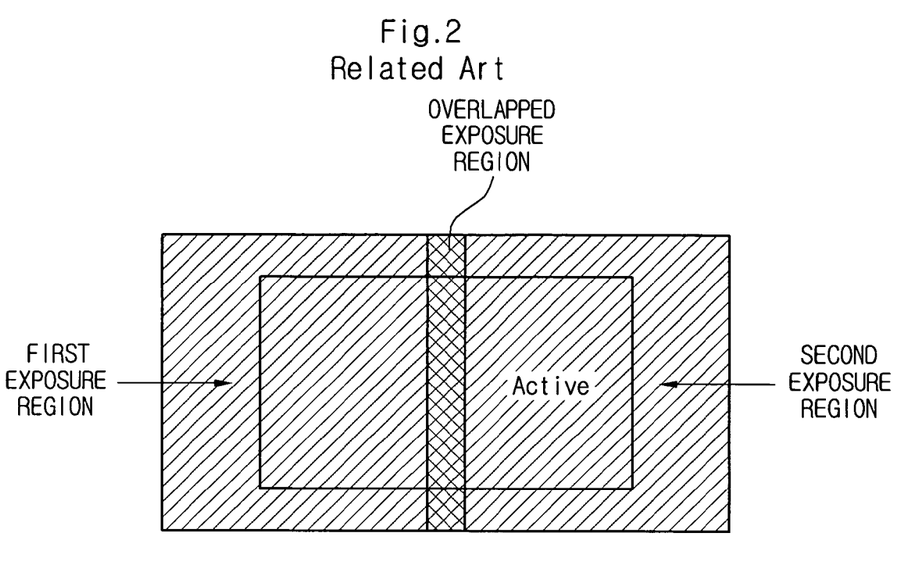
FIG. 2 illustrates overlapped exposure regions when a partitioned exposure process is performed.

FIG. 2 illustrates overlapped exposure regions when a partitioned exposure process is performed.

Referring to FIG. 2, when a plurality of partitioned exposure processes are performed on one active region as shown in (b) of FIG. 1, an overlapped exposure region may occur at a boundary portion between the partitioned exposure regions due to, for example, a defective alignment between the mask and the glass substrate, a tilted exposure device, or the like.

As shown in FIG. 2, the partitioned exposure process includes a first exposure that exposes an active region within a predetermined width from a left edge of an active region formed on a glass plate. By the first exposure, a first exposure region is formed on the active region. After performing the first exposure, a second exposure is carried out on an adjacent active region to form a second exposure region. When the second exposure is carried out, an overlapped exposure portion is formed at a boundary region between the first exposure region and the second exposure region.

Figure 3:
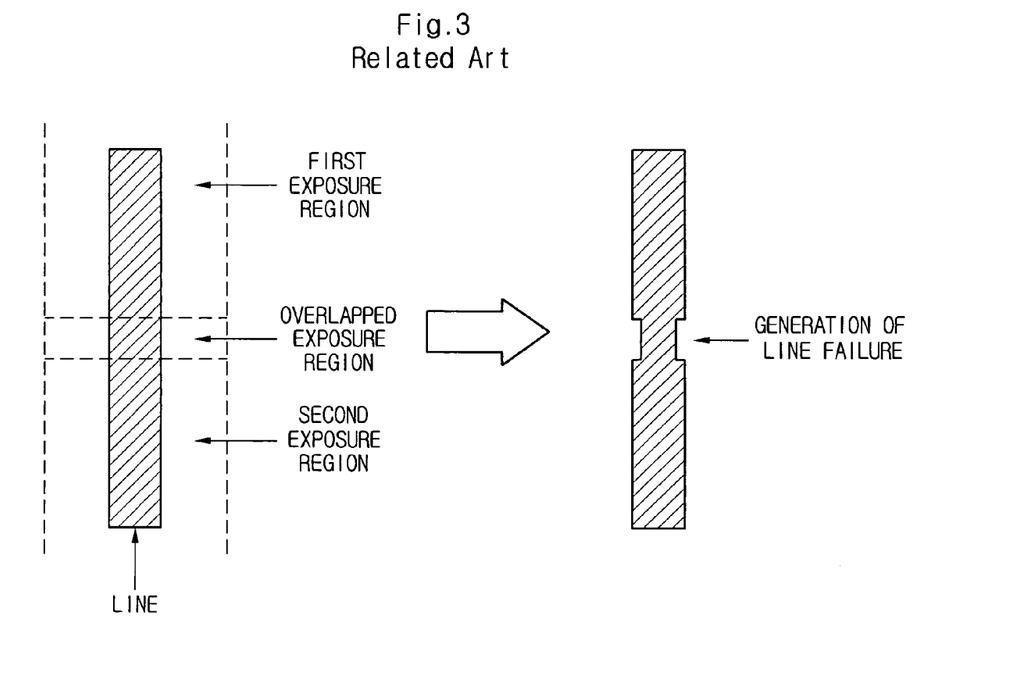
FIG. 3 illustrates a line failure generated when a partitioned exposure process is performed.

FIG. 3 illustrates a line failure generated when a partitioned exposure process is performed.

Referring to FIG. 3, when an overlapped exposure region occurs as shown in FIG. 2, a line width at the first and second exposure regions is formed to be larger than that at the overlapped exposure region.

In this case, the line resistance is undesirably increased.

Also, when the line is a pixel electrode or a common electrode, the storage capacitance determined by the gap between electrodes is undesirably changed, thereby degrading image quality.

Moreover, a line pattern failure due to the overlapped exposure causes stitches in the active region or a short circuit due to a reduced process margin.

SUMMARY

Accordingly, the present invention is directed to an exposure mask pattern for an LCD and an exposure method using the same that substantially obviates one or more problems due to limitations and disadvantages of the related art.

Described herein is an exposure mask pattern for an LCD and an exposure method using the same, which divides the sub-pixel region into two or more exposure regions and then performs a LEGO pattern exposure on the exposure regions on a sub-pixel basis. This exposure method minimizes left and right process deviations in the sub-pixel region and thereby prevents the generation of an undesirable spot or stitch.

Also described herein is an exposure mask pattern for an LCD and an exposure method using the same, which performs the LEGO pattern exposure on a pixel basis, thereby making it possible to merge process deviations generated during the exposure process in the RGB pixel and thus prevent a stitch failure.

Additional advantages, objects, and features will be set forth in part in the description which follows and in part will become apparent to those having ordinary skill in the art upon examination of the following or from practice of the invention. The objectives and other advantages may be realized and attained by the structure particularly pointed out in the written description and claims hereof, as well as the appended drawings.

In one aspect, an exposure method for an LCD includes: dividing a sub-pixel region of an array substrate into a first exposure region and a second exposure region; and sequentially exposing the first exposure region and the second exposure region.

In another aspect, an exposure method for an LCD includes: dividing a pixel region of an array substrate into a first exposure region and a second exposure region, the pixel region including R/G/B sub-pixel regions; and sequentially exposing the first exposure region and the second exposure region.

In another aspect, an exposure mask pattern used for an LCD is described, wherein a pattern of a mask region corresponding to an overlapped exposure region in a partitioned exposure is formed to be wider than mask patterns corresponding to other exposure regions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding and are incorporated in and constitute a part of this application, illustrate various embodiment(s) and together with the description serve an explanatory purpose. In the drawings.

DETAILED DESCRIPTION

Reference will now be made in detail to the preferred embodiments, examples of which are illustrated in the accompanying drawings. Wherever possible, the same reference numbers will be used throughout the drawings to refer to the same or like parts.

An LEGO pattern exposure for overcoming the problem of the related art partitioned exposure will be now described.

Figure 4:
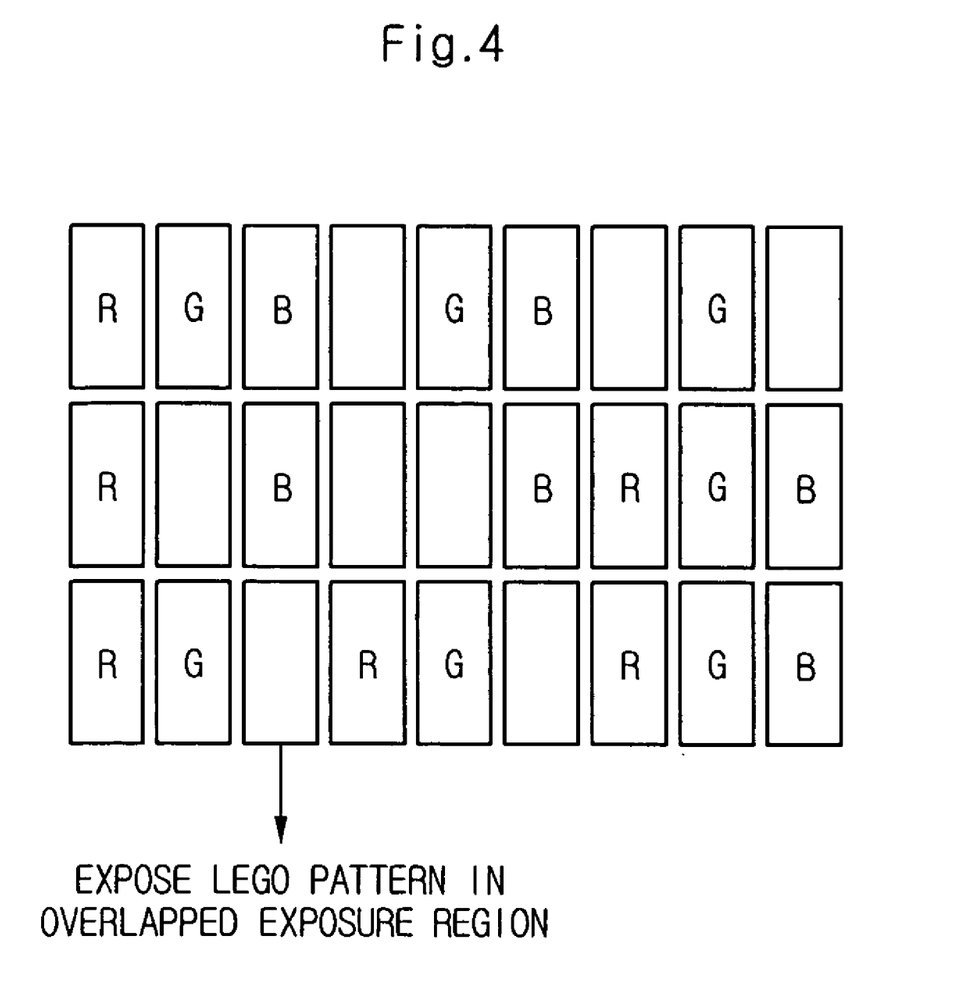
FIG. 4 illustrates an LEGO pattern exposure for preventing a stitch failure generated in an overlapped exposure region.

FIG. 4 illustrates an LEGO pattern exposure for preventing a stitch failure generated in an overlapped exposure region.

Referring to FIG. 4, in the LEGO pattern exposure, an exposure is performed on overlapped exposure regions on a sub-pixel basis. Here, sub-pixel means an R, G, or B pixel.

That is, only a portion of the R/G/B pixels is exposed in a first exposure process and then only the remaining portions of the pixels (that is, blank pixels in the first exposure process) are exposed in a second exposure process.

This partitioned exposure method can prevent a stitch failure that may be caused by an overlapping exposure.

However, when the LEGO pattern exposure is performed on a sub-pixel basis, an electric field distortion may be generated on a sub-pixel basis, such that more serious spots occur.

Figure 5A:
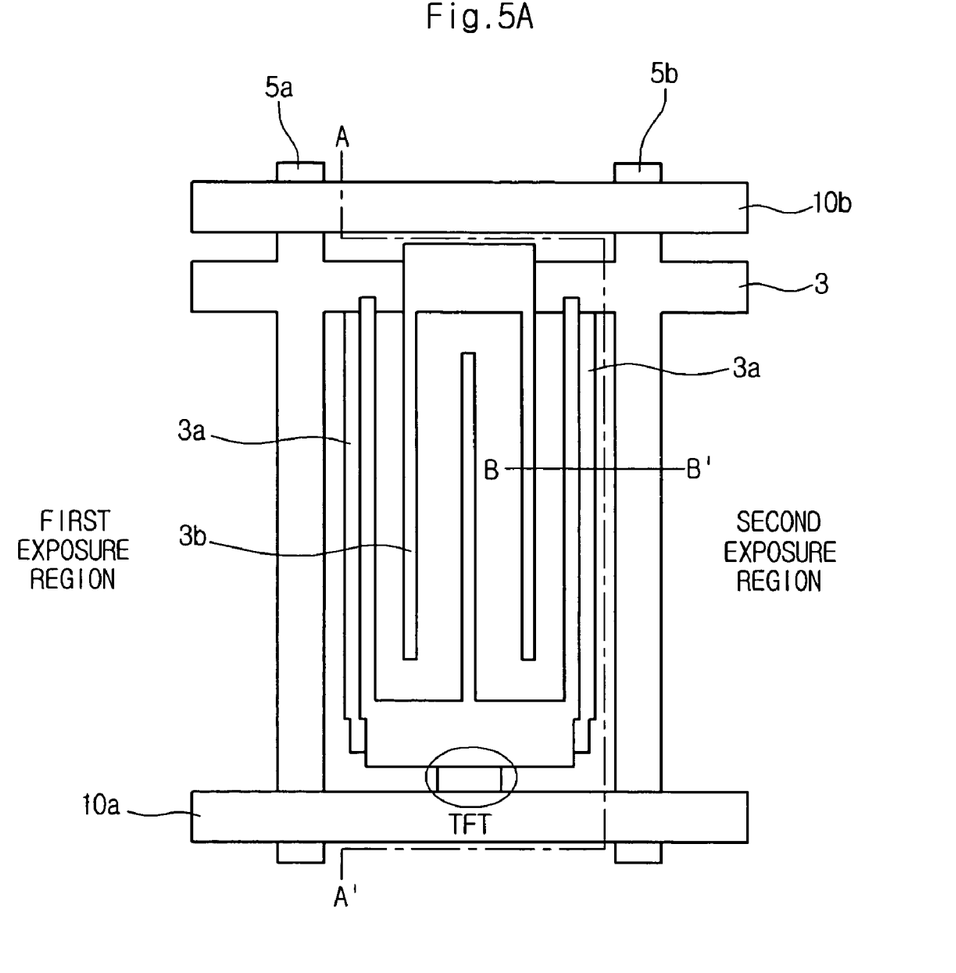
FIG. 5A illustrates a process of performing an LEGO pattern exposure on a sub-pixel basis in an LCD.

FIG. 5A illustrates a process of performing an LEGO pattern exposure on a sub-pixel basis in an LCD.

In FIG. 5A, the LCD is an in-plane switching (IPS) mode LCD that generates a horizontal electric field by using a pixel electrode and a common electrode that are alternately arranged.

Referring to FIG. 5A, in the IPS mode LCD, gate lines 10a and 10b and data lines 5a and 5b are arranged perpendicularly to each other to thereby define a sub-pixel region. A thin film transistor (TFT) serving as a switching device is formed between the gate line 10a and a pixel electrode 9 in the sub-pixel region.

A common line 3 is formed in parallel to the gate line 10b on the same plane. A slit-type first common electrode 3a is formed at the common line 3 and a slit-type second common electrode 3b is formed on the same plane as the pixel electrode 9 to electrically contact with the common line 3.

The first and second common electrodes 3a and 3b are alternately arranged spaced apart from each other in the sub-pixel region.

In the IPS mode LCD, a first exposure region of the sub-pixel region is exposed along an A-A' partition region and then a second exposure region of the sub-pixel region is exposed so that the already-exposed sub-pixel region is not exposed again. Consequently, a stitch failure is prevented.

Figure 5B:
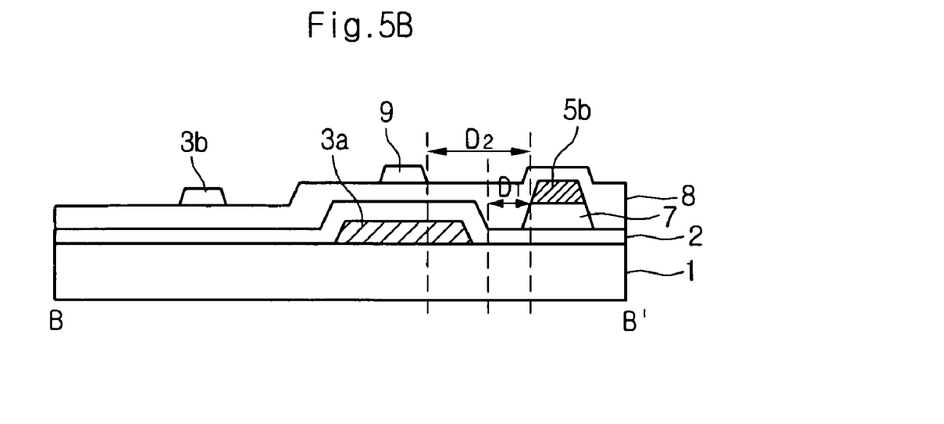
FIG. 5B illustrates a problem that arises when an LEGO pattern exposure is performed on a sub-pixel basis in an LCD.

FIG. 5B illustrates a problem that arises when an LEGO pattern exposure is performed on a sub-pixel basis in an LCD. FIG. 5B is a cross-sectional view taken along line B-B' in FIG. 5A.

Referring to FIG. 5B, the first common electrode 3a is formed on a lower substrate 1 and a gate insulating layer 2 is deposited on the first common electrode 3a.

A data line 5b is formed on the gate insulating layer 2. When the LCD is manufactured through a 4-mask process, an active layer 7 is disposed under the data line 5b.

A passivation layer 8 is formed on the data line 5b, and a pixel electrode 9 and a second common electrode 3b are formed on the passivation layer 8.

When an LEGO pattern exposure is performed on a sub-pixel basis as shown in FIG. 5A, a process deviation D1 occurs between the data line 5b and the first common electrode 3a.

Therefore, a distance deviation occurs between the first common electrode 3a and the data line 5a that exists in a region other than the first and second exposure regions, causing an unequal electric field.

Likewise, a distance deviation D2 occurs between the data line 5b and the pixel electrode 9 and thus a distance deviation occurs between the pixel electrode 9 and the data line 5a that exists in a region other than the first and second exposure regions, causing an undesirable stitch.

The present aims at overcoming the above drawbacks of the related art LEGO pattern exposure. That is, in the present invention, an LEGO pattern exposure is performed on an RGB pixel basis in an overlapped exposure region. Accordingly, process deviations occurring during the exposure process are merged into one white pattern in the RGB pixel, thereby preventing a stitch failure.

Hereinafter, the preferred embodiments will be described in detail with reference to the accompanying drawings.

Figure 6:
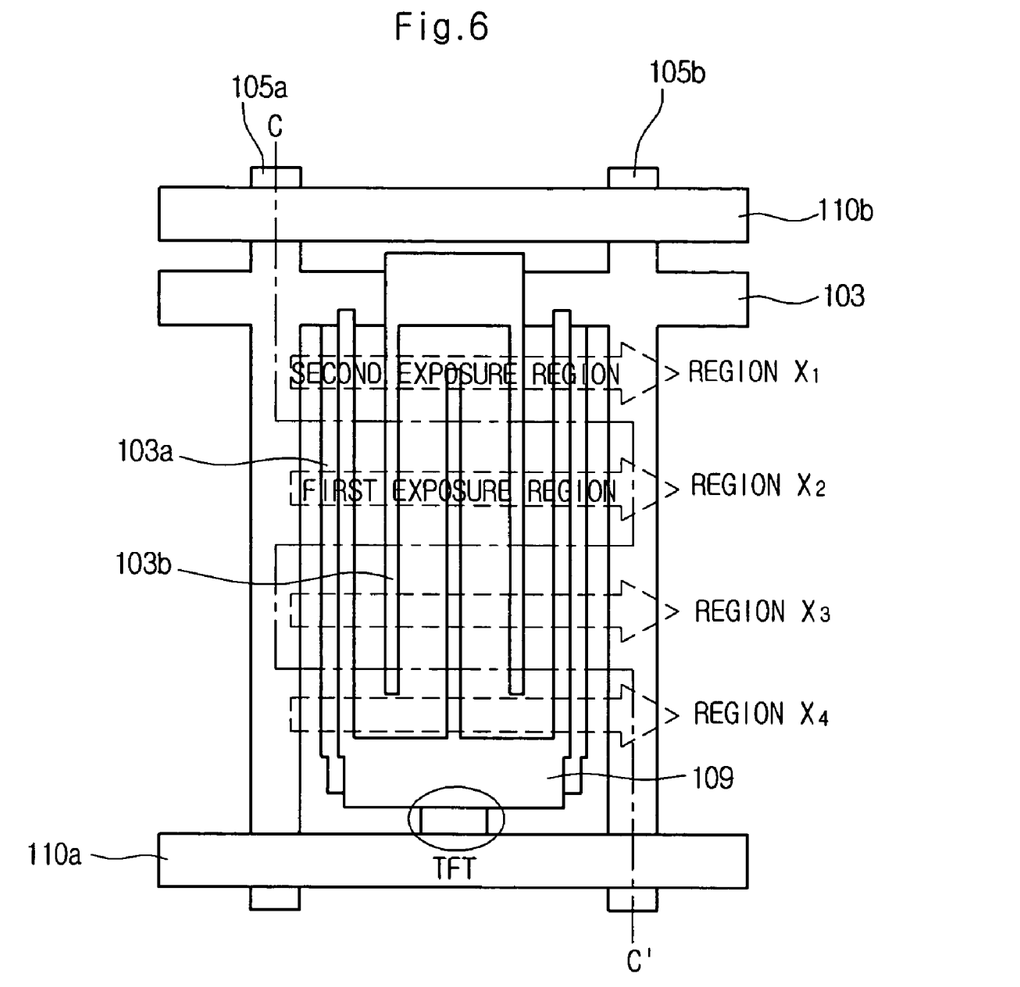
FIG. 6 illustrates a process of performing an LEGO pattern exposure on a sub-pixel basis in an LCD according to one embodiment.

FIG. 6 illustrates a process of performing an LEGO pattern exposure on a sub-pixel basis in an LCD according to one embodiment.

In FIG. 6, the LCD is an IPS mode LCD that generates a horizontal electric field for a wide viewing angle.

Referring to FIG. 6, in the IPS mode LCD, gate lines 110a and 110b and data lines 105a and 105b are arranged perpendicularly to each other, thereby defining a sub-pixel region. A TFT serving as a switching device is formed between the gate line 110a and a pixel electrode 109 in the sub-pixel region.

A common line 103 is formed in parallel to the gate line 110b on the same plane. A plurality of slit-type first common electrodes 103a are formed at the common line 103 and a plurality of slit-type second common electrodes 3b are formed on the same plane as the pixel electrode 109 to electrically contact with the common line 103.

The first and second common electrodes 103a and 103b are alternately arranged spaced apart from each other in the sub-pixel region.

In each sub-pixel region of the IPS mode LCD, a plurality of first exposure regions and a plurality of second exposure regions are formed along a C-C' partition region. Preferably, an entire exposure region of each sub-pixel is divided into two or more regions.

When the entire exposure region is divided into two exposure regions, that is, a first exposure region and a second exposure region, a step exposure is sequentially performed on the first and second exposure regions according to a partitioned exposure process.

In other words, when the first exposure region is exposed, the second exposure region is not exposed.

Likewise, when the second exposure region is exposed, the already-exposed first exposure region is not exposed.

The sub-pixel region includes an LEGO pattern for partitioning the sub-pixel region into the first and second exposure regions.

The LEGO pattern corresponds to a region experiencing an overlapped exposure during the partitioned exposure process.

Accordingly, exposure process deviations at the respective exposure regions are compensated with each other and thus the overall exposure process deviation of the sub-pixel region is reduced.

That is, when regions $X_1$ and $X_3$ correspond to the second exposure region and regions $X_2$ and $X_4$ correspond to the first exposure region as shown in FIG. 6, exposure process deviations at the respective exposure regions are compensated with one another. As a result, the overall exposure process deviation of the sub-pixel region is reduced.

In the case of the IPS pixel structure, distance deviations generated at the data lines 105a and 105b, the common electrode 103a and the pixel electrode 109 during the exposure of the first exposure region are compensated with distance deviations generated during the exposure of the second exposure region, thereby preventing a stitch failure that may be caused by a possible unbalance of the electric field.

Although the above method has been described with respect to the IPS mode LCD in which the pixel and common electrodes are formed on the lower substrate, it also can be applied to an LCD in which a pixel electrode is formed on a lower substrate and a common electrode is formed on an upper substrate.

Figure 7:
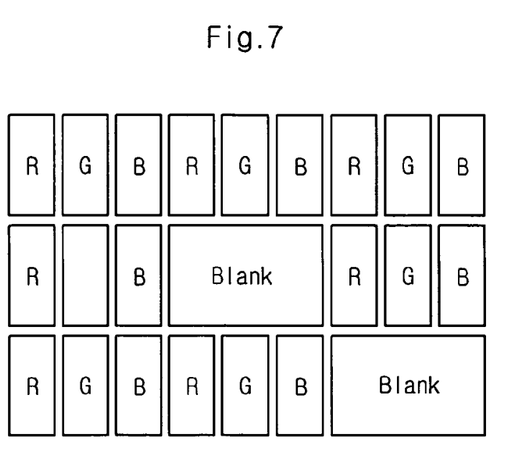
FIG. 7 illustrates a process of performing an LEGO pattern exposure on a pixel basis in an LCD according to another embodiment.

FIG. 7 illustrates a process of performing an LEGO pattern exposure on a pixel basis in an LCD according to another embodiment.

As shown in FIG. 7, an LEGO pattern exposure is performed on an overlapped exposure region on a RGB pixel basis. Here, the RGB pixel is constituted by R, G and B sub-pixels.

That is, during a first exposure process, an LEGO pattern exposure is performed on some RGB pixels, but not the remaining RGB pixels (blank pixels).

Likewise, during a second exposure process, an LEGO pattern exposure is performed on the remaining RGB pixels (blank pixels), but not the already-exposed RGB pixels.

In this case, exposure deviations of the first and second exposure regions are generated for the whole pixel region. These exposure deviations are merged in the RGB pixel and thus displayed as a white color. Accordingly, a possible stitch failure, which may be caused by an overlapped exposure, can be prevented.

Although the above method has been described with respect to the IPS mode LCD in which the pixel and common electrodes are formed on the lower substrate, it also can be applied to an LCD in which a pixel electrode is formed on a lower substrate and a common electrode is formed on an upper substrate.

Figure 8:
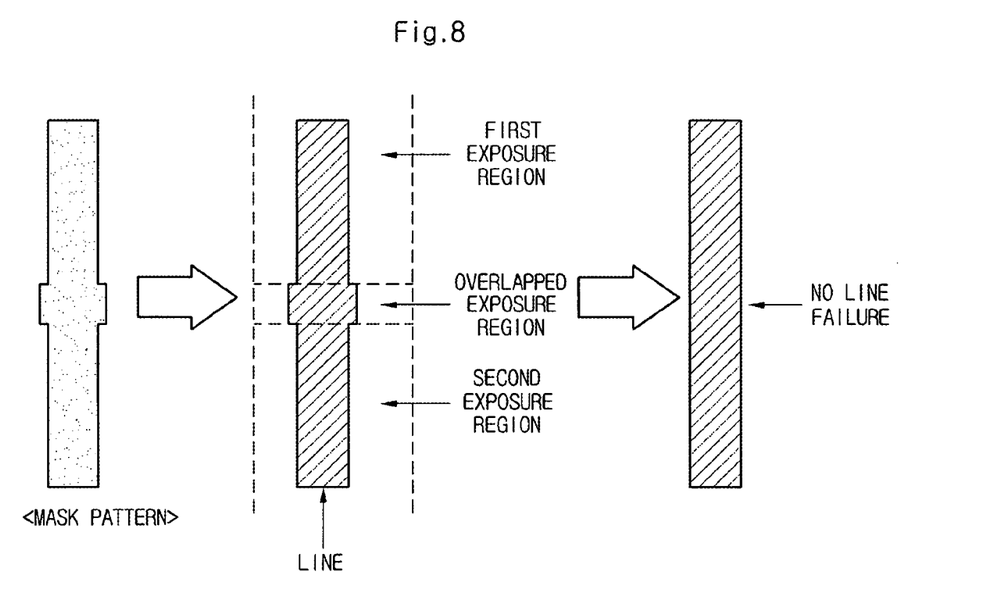
FIG. 8 is an enlarged view illustrating the width of a mask pattern corresponding to an overlapped exposure region.

FIG. 8 is an enlarged view illustrating the width of a mask pattern corresponding to an overlapped exposure region.

In a manufacturing process for an array substrate of the LCD, when a mask process is performed many times and an exposed lens becomes larger, the unit cost of the exposure device increases. Accordingly, a partitioned exposure process may be performed.

When a photoresist layer is patterned through a partitioned exposure process, the line width may be decreased undesirably at an overlapped exposure region.

To solve this problem, a mask pattern width at an overlapped exposure region is formed to be larger than that at a non-overlapped exposure region.

The elements formed on the array substrate that are patterned through a mask process and correspond to the mask pattern include a pixel electrode, a common electrode, a gate line, a data line, and so on.

As described above, the present invention divides the sub-pixel region into two or more exposure regions and then performs the LEGO pattern exposure on the exposure regions on a sub-pixel basis. It is possible, therefore, to minimize a left and right process deviation in the sub-pixel, thus preventing the generation of an undesirable spot or stitch.

Also, the present invention performs the LEGO pattern exposure on a pixel basis, thereby making it possible to merge process deviations generated during the exposure process in the RGB pixel. A stitch failure is therefore prevented.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An exposure method for a liquid crystal display (LCD) device, the method comprising:
    dividing a sub-pixel region of an array substrate into a plurality of first exposure regions and a plurality of second exposure regions, the first exposure regions and the second exposure regions alternately and in parallel arranged each other within the sub-pixel region and the sub-pixel region being one of a red sub-pixel region, a green sub-pixel region and a blue sub-pixel region;
    simultaneously exposing the first exposure regions of the sub-pixel region using a first exposure process; and
    simultaneously exposing the second exposure regions of the sub-pixel region using a second exposure process,
    wherein the sub-pixel region includes a plurality of LEGO patterns corresponding to regions experiencing overlapped exposures that are overlap of a first exposure exposing the first exposure regions and a second exposure exposing the second exposure regions, the LEGO patterns being formed between the first exposure regions and the second exposure regions respectively, and
    wherein the first exposure process and the second exposure process completes exposure of the sub-pixel region for forming one of a pixel electrode, a common electrode, a gate line and a data line.

2. The exposure method according to claim 1, wherein widths of mask patterns corresponding to regions experiencing the overlapping exposures are respectively formed to be wider than that of mask patterns corresponding to the first and second exposure regions such that one of a pixel electrode, a common electrode, a gate line and a data line is formed using the mask pattern.

3. The exposure method according to claim 1, wherein exposure deviations at the first exposure regions are respectively compensated by exposure deviations at the second exposure regions to reduce a total exposure deviation of the sub-pixel region.

4. The exposure method according to claim 1, wherein the LCD is an in-plane switching (IPS) mode LCD in which a pixel electrode and a common electrode are formed on a lower substrate.

5. An exposure method for a liquid crystal display (LCD) device, the method comprising:
    dividing a plurality of pixel regions of an array substrate into a plurality of first exposure regions and a second exposure region, the first exposure regions randomly arranged within the second exposure region, and the pixel region including a red sub-pixel region, a green sub-pixel region and a blue sub-pixel region;
    simultaneously exposing the first exposure regions using a first exposure process; and
    exposing the second exposure region using a second exposure process,
    wherein the first exposure region includes the red sub-pixel region, the green sub-pixel region and the blue sub-pixel region of the pixel region, and the second exposure region includes a region except the first exposure regions, and
    wherein a LEGO pattern is formed between the first exposure region and the second exposure region and corresponds to a region experiencing an overlapped exposure that is overlap of a first exposure exposing the first exposure region and a second exposure exposing the second exposure region.

6. The exposure method according to claim 5, wherein the second exposure region is partitioned as a blank region.

7. The exposure method according to claim 5, wherein the second exposure region is not exposed when the first exposure region is exposed.

8. The exposure method according to claim 5, wherein the first exposure region is partitioned as a blank region.

9. The exposure method according to claim 5, wherein the first exposure region is not exposed when the second exposure region is exposed.

10. The exposure method according to claim 5, wherein an exposure deviation at the first exposure region is compensated by an exposure deviation at the second exposure region, thereby preventing a spot failure.

11. The exposure method according to claim 5, wherein the LCD is an in-plane switching (IPS) mode LCD in which a pixel electrode and a common electrode are formed on a lower substrate.

12. The exposure method according to claim 5, wherein a width of mask pattern corresponding to a region experiencing the overlapping exposure is formed to be wider than that of a mask pattern corresponding to the first and second exposure regions such that one of a pixel electrode, a common electrode, a gate line and a data line is formed using the mask pattern.

* * * * *